Nov. 17, 1931.  L. ROSENBERG  1,832,244
BEVELING GLASS
Filed Sept. 10, 1931   3 Sheets-Sheet 1
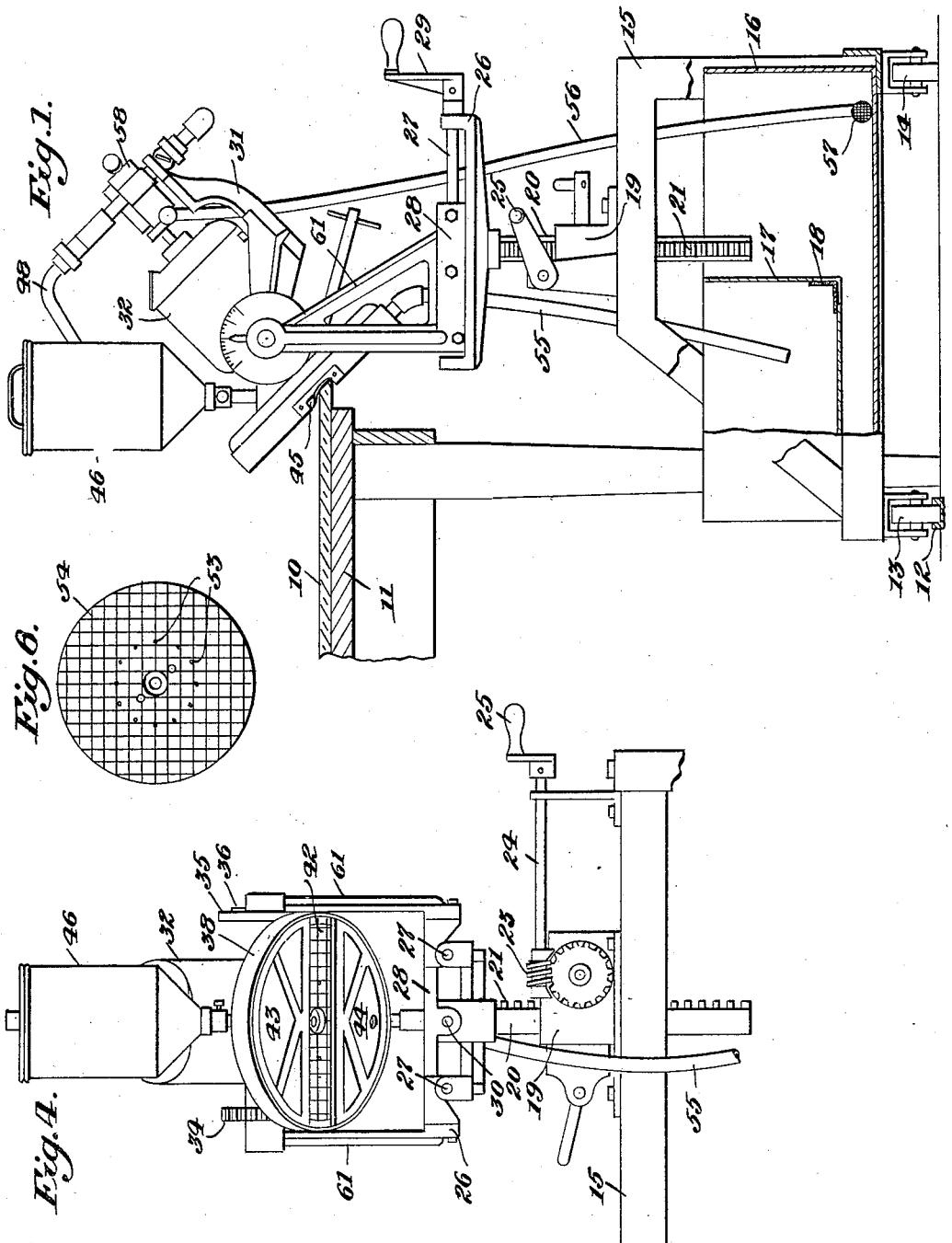
Inventor:
Louis Rosenberg,
by Karl Finning
his Att'y.

Nov. 17, 1931. L. ROSENBERG 1,832,244
BEVELING GLASS
Filed Sept. 10, 1931 3 Sheets-Sheet 2
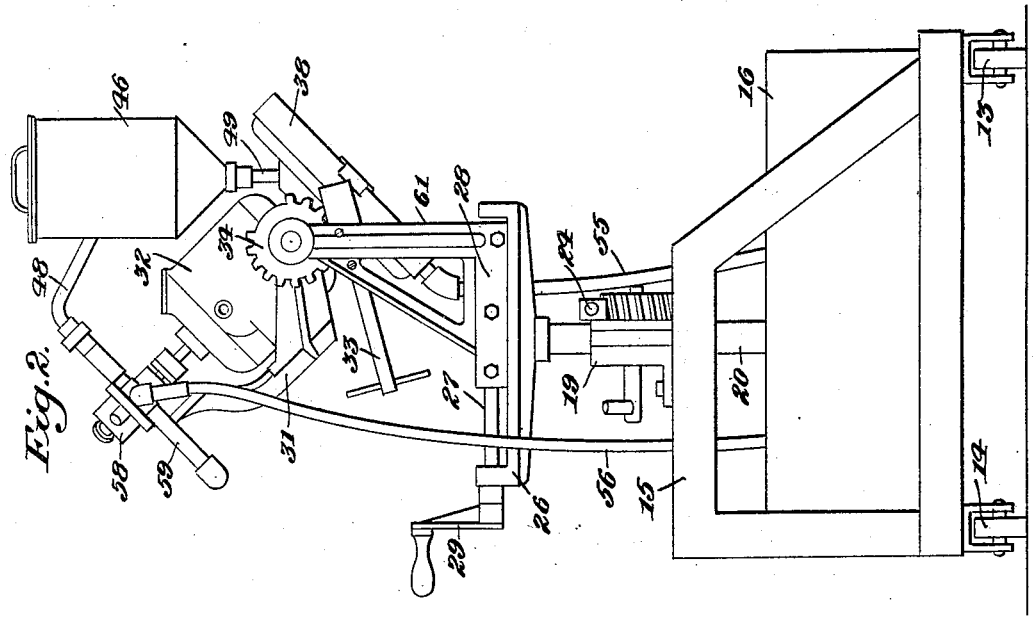
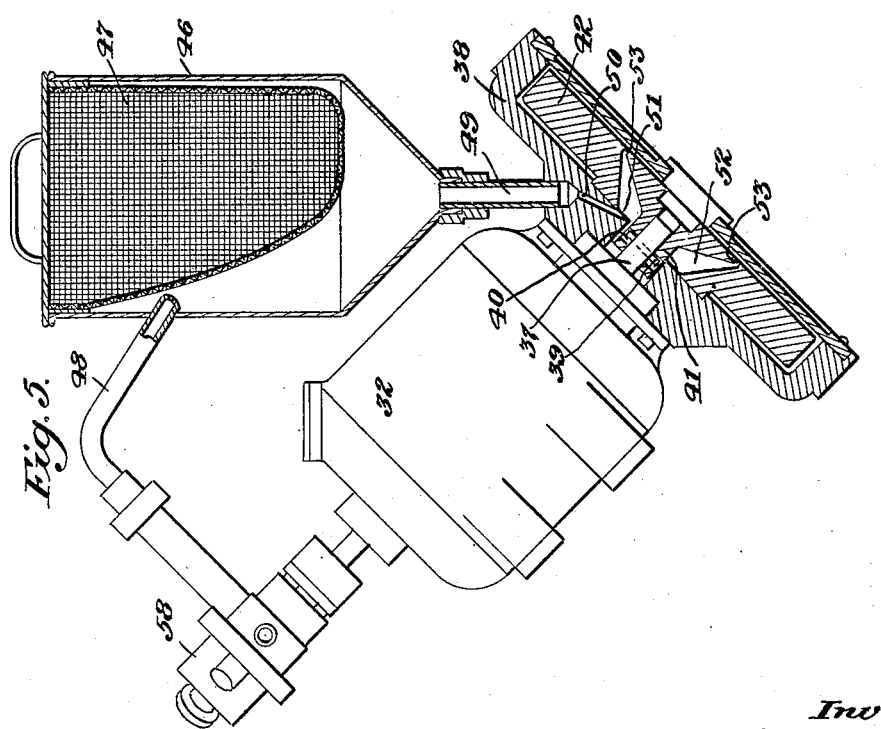
Inventor:
Louis Rosenberg,
by Carl Fraening
his Att'y.

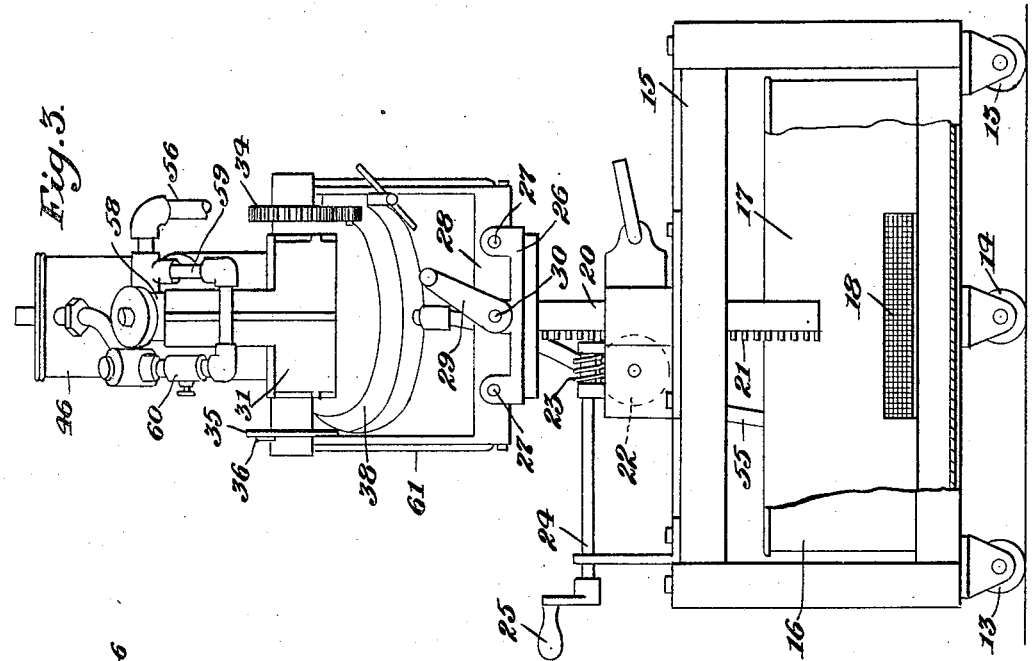

Patented Nov. 17, 1931

1,832,244

UNITED STATES PATENT OFFICE

LOUIS ROSENBERG, OF BROOKLYN, NEW YORK

BEVELING GLASS

Application filed September 10, 1931. Serial No. 562,159.

The invention relates particularly to a craning machine for craning glass. In manufacturing and installing windows, such as store fronts, plates or sheets of glass are placed with their edges together at an angle generally without a covering support at the joint. These plates are frequently of large size of thick glass and of great weight. Such plates are not only difficult to handle, manipulate, work and install but are also very expensive so that the marring or destroying of the plates produces considerable and material loss to the owner or operator. In order that the joint be satisfactory to stand the weather it is essential that the edges of the plates where they meet be uniform and exactly shaped or beveled so as to appropriately fit each other.

Since each manufacturing and installing job is substantially a rule to itself the sheets or plates are ordinarily not factory made but are worked or formed especially for each installation. The angle at which the plates meet in different installations varies widely as does the size of the plate employed.

The production of the appropriately beveled edge on plate glass is referred to in the art as craning and the present invention is directed toward this end. Craning of course is a type of beveling although the term beveling is commonly applied to producing a more or less extended tapered edge to a plate especially such as is frequently found in a mirror. While the present invention might be applied to such use, it is especially adapted for craning.

The complete machine comprises a grinding surface to which may be fed water and a grinding material, such as for instance carborundum, to properly cut and work upon the glass. The grinding and feeding apparatus may be mounted upon a portable structure which when in operation may travel along the plate of glass upon which it operates. The grinding head may be adjustable up and down so as to engage the plate on whatever level it may be placed. The grinding head may be adjustable so as to attack the plate at any desired or suitable angle and means may be provided for causing the grinding head to move toward and from the plate as the grinding proceeds.

While the invention is not limited to specific details, one form of apparatus embodying the invention is illustrated in the accompanying drawings in which Figure 1 is a side elevation of the machine in position to perform the craning operation on a sheet of glass. Fig. 2 is a similar side elevation taken from the other side of the machine. Fig. 3 is a rear elevation. Fig. 4 is a partial front elevation. Fig. 5 is an enlarged side elevation, broken away in part, of the grinding head together with its operating motor and mechanism for feeding water and grinding material to it. Fig. 6 is a face plan of the grinding disc. Fig. 7 is a fragmentary sectional detail of an optional arrangement.

A sheet of glass 10 is illustrated as lying upon a suitable support or table 11. It may lie at any angle but preferably horizontally and may be clamped or locked rigidly in place. A track 12 on the floor under the table forms a runway for the two wheels 13 on the front end of the craning machine. This track might be supported on the table itself or the entire apparatus might be suspended from a guide or track in or on the ceiling or an overhanging support. It is desirable that the tract be straight and be very accurately and carefully arranged substantially parallel to the front edge of the table or to the side of the glass which is to be operated on. The back of the machine may be supported by a single wheel or caster 14 which may run loosely on the floor. Resting on the wheels is a frame or support 15 carrying a tank 16 within which is a second smaller tank 17 shallower and smaller than the tank 16 and provided at a lower corner on both side and bottom with a screen or strainer 18 preferably of wire gauze. Carried in the frame 15 is a head 19 through which passes a vertical supporting shaft 20 on which is a rack 21 which is engaged by a suitable gear arrangement 22 driven by a worm 23 on a shaft 24 operated by a handle 25. At the top of the vertical shaft 20 is horizontal bed 26 carrying guide rods 27 upon which is mounted a frame 28. A handle 29 operates a threaded rotary shaft 30 mounted in the bed 26 and engaging the frame 28 to cause it to move transversely on the bed 26 as guided by the rods 27. Likewise from the frame 28 are upwardly extending side arms 61 in which is pivoted a cradle 31 carrying a motor 32. The angular position of the cradle 31 and the motor 32 may be adjusted by rotating a shaft 33 carrying a worm engaging a gear 34 on the cradle and the angular position assumed may be determined and indicated by a graduated dial 35 cooperating with an index finger 36 carried by the side arm 61. Fastened to the motor 32 and surrounding its shaft 37 is a casing 38. The motor shaft 37 carries diametrically extending pins 39 which engage in slots 40 in a sleeve or shank 41 rising from or attached to the rear of a grinding face or disc 42 which is enclosed by the casing 38. The open side of the casing 38 is closed by two plates 43 and 44 which cover substantially all of the grinding face except a strip of suitable width around its horizontal diameter through which the glass to be operated on projects as indicated in Fig. 1. In order to prevent splashing at the ends this opening is provided with suitable curtains 45 which may be of rubber or other suitable flexible material to harmlessly drag upon the edge of the glass to be operated on. Mounted on the casing 38 is a hopper 46 within which is a container 47 in which may be placed a suitable granular abrasive or grinding material such as carborundum or the like. Entering the hopper 46 is a pipe 48 through which water may be forced and sprayed against one side of the container 47 which, or at least that portion adjacent the spraying and thereabouts, may be made of a strainer material such as wire gauze through which the water may force the grinding material. Preferably from the bottom of the hopper 46 leads a pipe 49 which enters a channel 50 in the casing 38 which communicates with a circular central opening 51 which in turn communicates with a projected annular opening 52 from which lead channels 53 to the face of the grinding disc 42 which may be provided with suitable grooves or distributing channels 54. The mixture of water and carborundum after reaching the grinding face and performing the grinding on the glass is retained by the casing 38 from which it is delivered through a pipe or hose 55 to the tank 17. The screen 18 retains the granular material but allows the water to go through to the tank 16 from which it may be withdrawn by a pipe or hose 56 provided with a gauze or strainer head 57. The pipe or hose 56 is connected to a pump 58, which may be of the rotary type, carried by the cradle 31 and preferably operated from the motor 32. The outlet from the pump 58 is connected to the pipe 48. It may not be desirable to feed to the grinding head the full water capacity of the pump. There may, therefore, be provided a by-pass 59 in which is a valve 60 which may be adjusted satisfactorily to control the quantity of water passing to the grinding head. Grinding material from the tank 17 may be returned to the container 47 and at the beginning and from time to time as needed water and grinding material may be added to the system.

The sheet of glass having been placed on the table, the grinding head may be set at the appropriate angle and the apparatus adjusted to the proper height. The wheels may be placed upon the track and the grinding head advanced, if necessary, to bring it in contact with the edge of the glass. The motor may then be started and the apparatus be set in motion being caused to transverse the edge of the glass by being moved along its track. Any slight irregularities in the edge of the glass may be corrected for by the play allowed in the connection between the motor shaft and the grinding head, the weight of which is sufficient to hold it snugly against the glass to be ground. It will be understood of course that preferably the grinding or craning will be done in several passes across the glass, that is instead of grinding to the final form at one point and then moving to the next point, the entire edge of the glass will be ground a slight amount and then the grinding head advanced and the remainder of the glass to be removed ground off in repeated passes across the sheet.

The construction of the annular passage 52 in the grinding head which is larger in diameter than the opening 51 insures that by the centrifugal force set up by the rotation of the grinding head the mixture of water and grinding material will be fed more or less regularly and continuously through the passages 53 to the grinding face itself where it will perform its function on the glass.

In the drawings the grinding face 42 is shown attacking the upper edge of the glass but it is obvious that if desired the shaft 20 may be lowered so as to allow the grinding face to attack the lower edge of the glass when the cradle 31 is properly turned or tipped for that purpose.

If desired a double outlet may be provided for the hopper 46 as shown in Fig. 7 where in addition to the pipe 49 there is a pipe 62 leading to a hole 63 through the edge of the casing 38 so as to deliver the mixture of water and grinding material directly to the grinding face 42 within the cover 43. A valve 64 may control the delivery to either or both pipes.

It will be seen that the present invention provides a self-contained portable unit which when not in use may be removed from the glass table which will then be free for other uses. The arrangement of the front guide wheels 13 somewhat in advance of the grinding head (to the left in Fig. 1) allows them to engage and be controlled by a track lying under the top of the table so that there is no impedence to the floor space around the table when the craning machine is not in use.

Other phases and advantages of the invention will readily be observed, it being understood that the apparatus here illustrated does not limit the invention which may be embodied in other forms of apparatus in whole or in part.

I claim as my invention:

1. In a machine for beveling glass, a grinding disc, a casing therefor open only along its front diameter, flexible curtains at the ends of the opening, a shaft for the disc passing through the casing, a reservoir about the shaft in the casing, and means for feeding water and a grinding material to the reservoir, the disc being provided with an expanded opening in the rear communicating with the reservoir and having outwardly inclined perforations connecting the outer portion of the opening with the grinding face.

2. In a machine for beveling glass, a grinding disc, a casing therefor open only along its front diameter, flexible curtains at the ends of the opening, a shaft for the disc passing through the casing, a reservoir about the shaft in the casing, means for feeding water and a grinding material to the reservoir, the disc being provided with an expanded opening in its rear communicating with the reservoir and having outwardly inclined perforations connecting the outer portion of the opening with the grinding face and additional means for feeding water and grinding material to the grinding face through the casing.

3. In a machine for beveling glass, a grinding disc, a casing therefor open only along its front diameter, flexible curtains at the ends of the opening, a shaft passing through the casing and carrying the disc within the casing and means for feeding water and a grinding material to the disc.

4. In a machine for beveling glass, a perforated grinding disc, a casing for the grinding disc open only along its front diameter, means for rotating the grinding disc including a shaft, means by which water and a grinding material may be introduced to the grinding face through the perforations in the disc as it rotates, and additional means for delivering water and a grinding material to the grinding face through the casing away from the opening.

LOUIS ROSENBERG.